United States Patent [19]

Black

[11] 4,016,962
[45] Apr. 12, 1977

[54] VIBRATION RESISTANT MECHANICAL CLUTCH
[75] Inventor: James B. Black, Roscoe, Ill.
[73] Assignee: Twin Disc, Incorporated, Racine, Wis.
[22] Filed: Nov. 3, 1975
[21] Appl. No.: 628,389
[52] U.S. Cl. ............................ 192/70.2; 64/1 V; 64/23; 188/1 B; 188/83; 192/30 V; 192/70.28; 192/70.29; 192/99 A; 403/320; 403/328; 403/359
[51] Int. Cl.² ................. F16D 13/56; F16D 49/00; F16F 13/02
[58] Field of Search ............ 192/30 V, 70.19, 70.2, 192/70.28, 70.29, 70.3, 99 A; 74/531; 64/1 V, 23; 151/24; 85/1 SS; 403/320, 328, 359; 188/1 B, 83

[56] References Cited
UNITED STATES PATENTS

| 230,009 | 7/1880 | Harding | 151/24 |
|---|---|---|---|
| 293,218 | 2/1884 | Berry | 85/1 SS |
| 1,592,114 | 7/1926 | Leo | 64/23 X |
| 2,024,016 | 12/1935 | Wear, Jr. | 74/531 X |
| 2,273,102 | 2/1942 | Harris et al. | 85/1 SS |
| 2,341,947 | 2/1944 | Roberts | 64/23 |
| 2,831,355 | 4/1958 | Zimmerman | 188/83 X |
| 3,072,235 | 1/1963 | Aschauer | 192/99 A |
| 3,237,976 | 3/1966 | Campoli | 151/24 X |
| 3,613,648 | 10/1971 | Peifer | 74/531 X |

FOREIGN PATENTS OR APPLICATIONS 681,145  9/1939  Germany ................. 192/70.19

Primary Examiner—Allan D. Herrmann
Attorney, Agent, or Firm—James E. Nilles

[57] ABSTRACT

A friction plate clutch for attachment to an internal combustion engine is protected against vibration induced wear of loosely interfitted parts thereof by spring devices which keep the parts yieldingly in firm contact with each other.

6 Claims, 6 Drawing Figures

VIBRATION RESISTANT MECHANICAL CLUTCH

BACKGROUND OF THE INVENTION

The invention relates to friction plate clutches and it is concerned more particularly with vibration and wear problems which are incurred in certain types of these clutches when they are used on internal combustion engines.

A friction plate clutch of the type which is apt to be adversely affected by engine vibrations is shown for instance in U.S. Pat. No. 3,072,235 granted Jan. 8, 1963 to G. R. Aschauer. Loosely interfitted parts of said clutch comprise a hub of an axially fixed backplate, an axially reciprocable pressure plate splined on the hub, a rotatable adjusting ring having internal screw threads engaging external screw threads of the hub, an axially reciprocable shift collar and its supporting shaft; and elements of an articulated loading mechanism for the pressure plate.

In the engaged condition of the clutch, its loosely interfitted parts are loaded and thereby kept in fixed predetermined positions relative to each other regardless of vibrations transmitted to them from an engine. On the other hand, disengagement of the clutch unloads the loosely interfitted clutch parts and they will then be moved slightly but continuously relative to each other by vibrations transmitted to them from the engine.

When the clutch is kept disengaged for long periods of time while the engine is running, as in a tractor power take-off mechanism, the continuous relative movements of the loosely interfitted clutch parts cause objectionable wear of their mutual contact areas by a combination of sliding and impact. Such wear is aggravated in engine front end locations of the clutch because the erratic motion of the engine front end causes acceleration in all directions which in turn promote relative motion of the loosely interfitted and unloaded clutch parts.

SUMMARY OF THE INVENTION

The present invention provides an improved friction plate clutch of the hereinabove outlined character which avoids the shortcomings of the prior art in the matter of objectionable wear due to engine vibrations.

According to the invention, motion inhibiting spring devices are interposed between loosely interfitted clutch parts whose contact areas are to be protected against objectionable wear. One such spring device is arranged so as to bias the pressure plate radially outward relative to the hub. The external splines of the hub and the internal splines of the pressure plate are thus retained in firm engagement with each other regardless of vibrations which are transmitted to the disengaged clutch from the engine.

Another spring device is arranged to bias the adjusting ring radially outward relative to the hub in order to inhibit vibration induced movement of the adjusting ring whose internal threads are loosely interfitted with external threads of the hub.

A further spring device is arranged to bias the sliding sleeve radially outward relative to its supporting shaft in order to inhibit vibration induced movements of the sliding sleeve when the clutch is disengaged while the engine is running.

Additional spring devices are arranged in the articulated loading mechanism for the pressure plate in order to inhibit vibration induced play of its joints when the clutch is disengaged while the engine is running.

The motion inhibiting spring devices for the pressure plate, adjusting ring, and sliding sleeve preferably incorporate coil springs which exert pressure in the direction of their axes radially outward upon the pressure plate, adjusting ring, and sliding sleeve, respectively. The motion inhibiting devices for the articulated loading mechanism are preferably provided by spring washers between pivotally interconnected parts thereof. The coil springs and spring washers thus render the clutch vibrations resistant in a simple, inexpensive and entirely satisfactory manner.

DRAWINGS

The foregoing and other features and advantanges of the invention will become more fully apparent from the following detailed description of a preferred embodiment with reference to the accompanying drawings wherein.

DETAILED DESCRIPTION

Figures 1, 2:
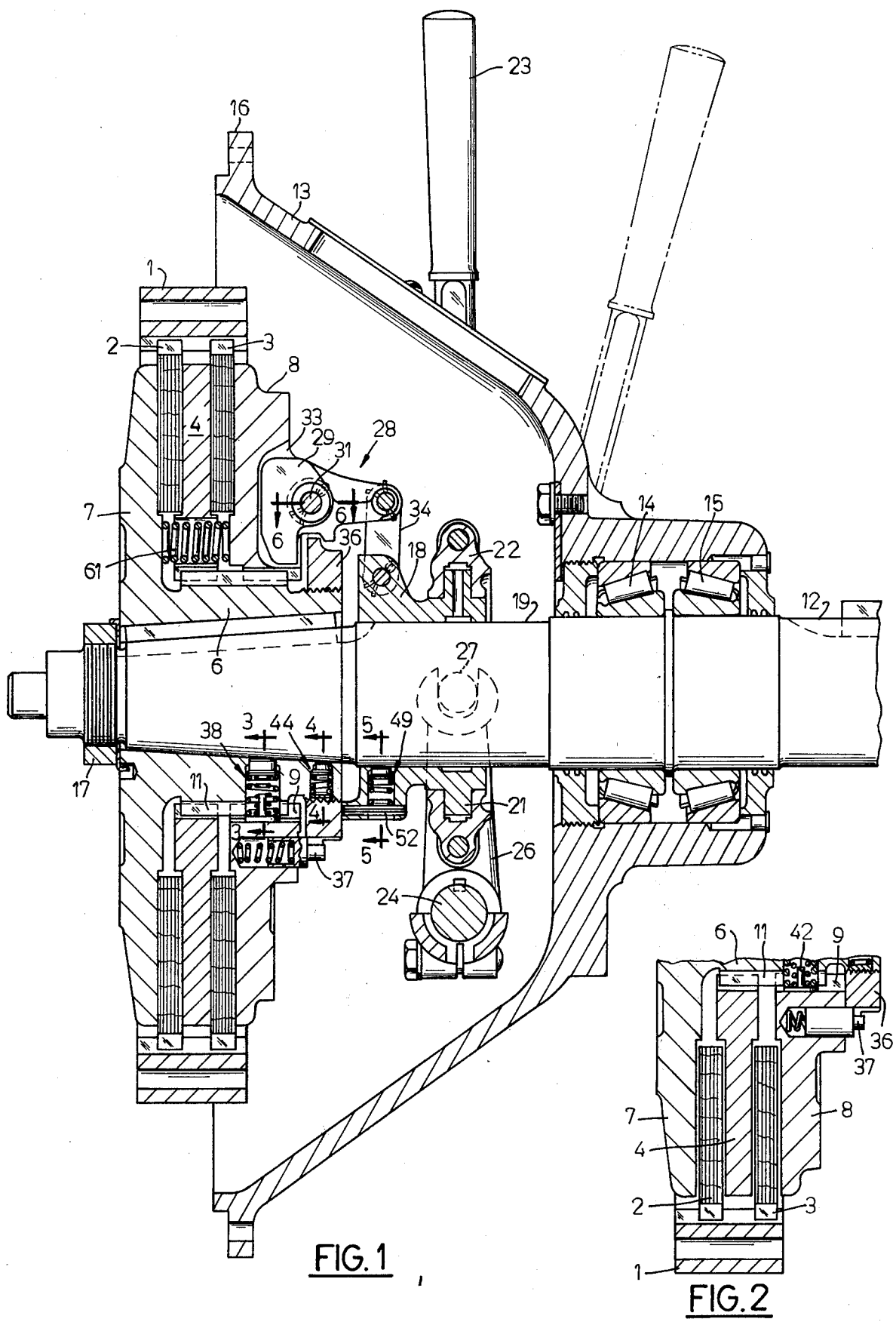
FIG. 1 is a vertical longitudinal section of an automotive type friction plate clutch which is provided with motion inhibiting spring devices according to the invention.
FIG. 2 is a sectional view illustrating the disengaged condition of the clutch shown in FIG. 1.
Figure 3:
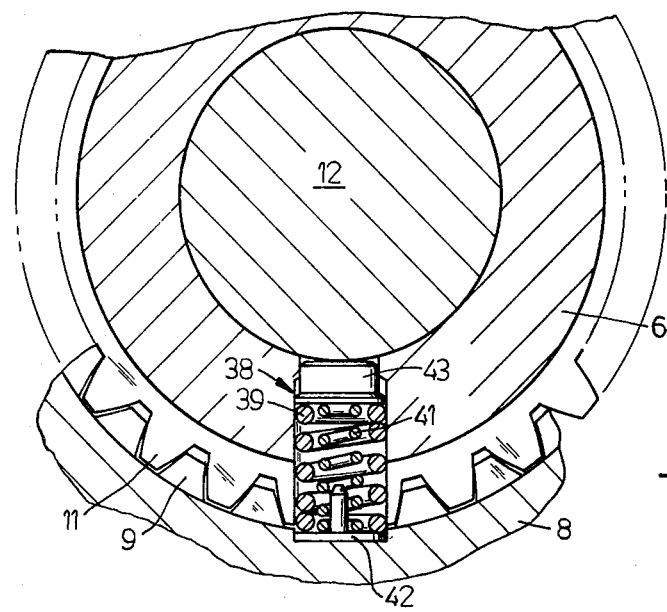
FIG. 3 is an enlarged section on line 3—3 of FIG. 1.

Referring to FIG. 1, the numeral 1 designates part of a clutch drum which is connectable in the usual manner to the shaft of an internal combustion engine, not shown. A pair of friction discs 2 and 3 are peripherally toothed for driven and axially slideable connection with the drum part 1 and are positioned in straddle relation to a center plate 4 which is internally toothed for driving and axially slideable connection with an externally splined hub 6. The hub 6 forms an integral part of a back plate 7 against which the stack of friction discs 2, 3 and center plate 4 are thrust by a pressure plate 8 which as shown in FIG. 3 has a circumferential series of internal gear teeth 9 in mesh with a circumferential series of external splines 11 of gear tooth profile on the hub 6.

As shown in FIG. 1, a clutch shaft 12 extends axially of the drum part 1 and is rotatably supported on a clutch housing 13 by a pair of roller bearings 14 and 15. The clutch housing 13 may be bolted to the body of an internal combustion engine by means of a flange 16, and engine vibrations will thus be transmitted to the clutch housing 13 and to the shaft 12. The hub 6 of the back plate 7 is keyed to a tapered portion of the shaft 12 and secured in position by a nut 17.

A sliding sleeve 18 on a cylindrical portion 19 of the shaft 12 is loosely fitted thereto with conventional radial clearance for easy shifting. An annular flange 21 of the sleeve 18 is straddled by a thrust collar 22. A hand operated shift mechanism for the sleeve 18 comprises a hand lever 23 secured to a transverse rock shaft 24 journalled in the housing 13. A pair of radial arms 26 (only one shown) of the rock shaft 24 straddle diametrically opposite trunions 27 of the thrust collar 22 in the usual manner.

A conventional articulated link mechanism 28 is operatively interposed between the sliding sleeve 18 and the pressure plate 8 so as to firmly compress the stack of friction discs 2, 3 and centerplate 4 by movement of the handlever into its clutch engaged position in which it is shown in full lines in FIG. 1, and so as to unload the friction discs, center plate 4 and pressure plate 8 by movement of the handlever 23 into its clutch disengaged position in which it is shown in broken lines in FIG. 1.

The articulated link mechanism 28 comprises three link assemblies which are circumferentially spaced 120 degrees apart around the shaft 12 and one of which is shown in FIG. 1. Each of these link assemblies comprises a lever 29 which is pivotally connected to the pressure plate 8 by means of a cross pin 31 as more clearly shown in FIG. 6. Lugs 32 and 33 are interfitted with the pivot pin 31 with the usual radial clearance, and the lever 29 and pin 31 are also loosely interfitted with the usual radial clearance as shown to an exaggerated extent in FIG. 6. A link 34 is pivotally connected at its opposite ends with the lever 29 and sleeve 18, and the lever 29 in conjunction with the link 34 affords a bellows-like or toggle action whereby the stack of interleaved clutch plates 2 and 3 are compressed upon movement of the handlever 23 into its full line FIG. 1 position, and whereby the stack of interleaved clutch plates is unloaded as shown in FIG. 2, when the handlever 23 is moved from its full line clutch engaged position to its broken line clutch disengaged position shown in FIG. 1.

An adjusting ring 36 for controlling the engaged condition of the clutch is loosely screw threaded upon the hub 6, the internal threads of the adjusting ring being interfitted with the external threads of the hub 6 with the usual axial and radial clearances. A reciprocable spring loaded locking plunger 37 for the adjusting ring 36 is mounted on the pressure plate 8 and operable in conventional manner to retain the adjusting ring 36 in any selected position of adjustment.

When the clutch is in its engaged condition as shown in FIG. 1 the loading of the pressure plate 8 by the toggle action of the link mechanism 28 inhibits peripheral and radial relative movements of the loosely interfitted pressure plate 8 and hub 6. Such relative movements, however, are apt to occur when the clutch is in its disengaged condition as shown in FIG. 2. In that case, the pressure plate 8 is unloaded and the clearances between its internal splines 9 and the external splines 11 of the hub would permit slight but continuous relative movements of the pressure plate 8 and hub 6 due to engine induced vibrations of the clutch. As a result of such relative movements the mutual contact are as of the splines 9 and 11 would become subject to objectionable wear by a combination of sliding and impact.

In order to prevent separation of the splines 9 and 11 in their clearance areas and thus eliminate impact loading, a spring device 38 is interposed between the hub 6 and the pressure plate 8 which biases the pressure plate into a radially fixed relation to the hub. As shown on an enlarged scale in FIG. 3, the spring device 38 comprises a pair of concentric coil springs 39 and 41; a pad 42 seated on the pressure plate 8, and a plunger 43 bearing against the shaft 12. The coil springs 39, 41 react between the pad 42 and plunger 43 radially outward and thereby bring contact areas of the splines 9 and 11 into firm but yieldable engagement with each other when the clutch is disengaged. Relative motion of the splines 9 and 11 will thus be greatly reduced or eliminated entirely, and objectionable wear of the splines due to engine induced vibrations of the clutch will be avoided.

Figure 4:
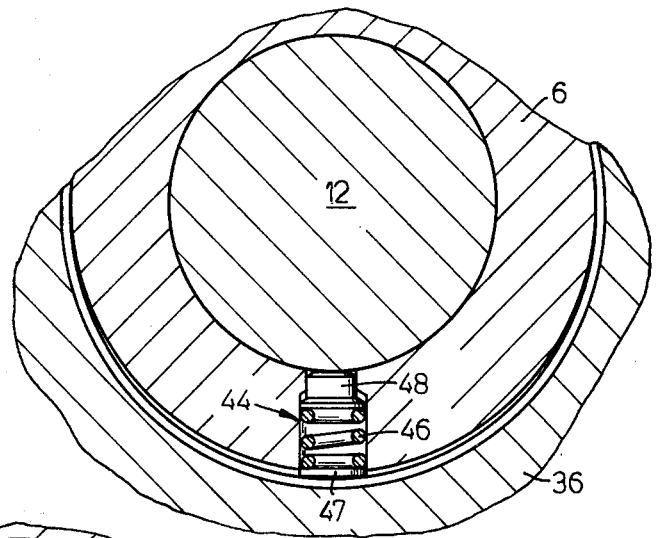
FIG. 4 is an enlarged section on line 4—4 of FIG. 1.

A similar situation exists with respect to the adjusting ring 36. In the disengaged condition of the clutch the threaded connection between the hub 6 and ring 36 is unloaded, and a spring device 44 is interposed between the hub and adjusting ring in order to avoid objectionable wear of the threads under the conditions outlined hereinbefore with respect to the splined connection between the hub 6 and the pressure plate 8. The spring device 44 comprises, a coil spring 46 (FIG. 4), a pad 47 bearing against the adjusting ring, and a plunger 48 bearing against the shaft 12. The coil spring 46 reacts between the pad 47 and plunger 48 radially outward and thereby brings contact areas of the threads on the hub and ring into firm but yieldable engagement with each other. The spring device 44 thus protects the threaded connection between the hub and adjusting ring against vibration induced wear in much the same manner as the spring device 38 protects the splines 9 and 11 of the hub 6 and pressure plate 8.

Figure 5:
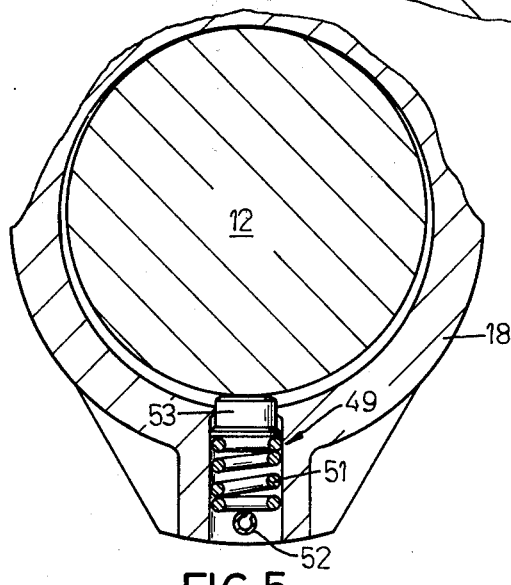
FIG. 5 is an enlarged section on line 5—5 of FIG. 1.

The radial clearance between the sliding sleeve 18 and shaft 12 could cause relative movement of these parts by engine vibrations while the clutch is in its disengaged condition. In order to inhibit such relative movements and prevent consequent wear of the mutual contact surfaces of the sleeve 18 and shaft 12, a third spring device 49 similar to the spring devices 38 and 44 is interposed between the shaft 12 and sleeve 18. The coil spring 51 (FIG. 5) of the spring device 49 reacts between a cross pin 52 on the sleeve 18 and a plunger 53 which bears upon the shaft 12. The expanding pressure of the spring 51 protects the mutual contact areas of the shaft 12 and sleeve 18 against relative movements by engine induced vibrations and consequent wear while the clutch is kept in its disengaged condition.

Figure 6:
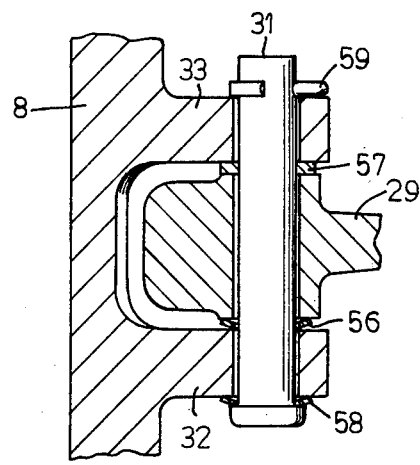
FIG. 6 is an enlarged section on line 6—6 of FIG. 1.

Referring to FIG. 6, a spring washer 56 and a plain washer 57 are interposed between the hub of the lever 29 and the lugs, 32, 33 of the pressure plate 8; and a spring washer 58 is interposed between the pivot pin 31 and the lug 32 of the pressure plate 8. A cotter pin 59 keeps the pivot joint between the pressure plate 8 and the lever 29 in its assembled condition. Axial pressure is set up between the lever 29 and the lug 32 by the spring washer 56; and axial pressure is set up between the pin 31 and the lug 32 of the pressure plate 8 by the spring washer 58. These axial pressures inhibit relative movements of the lever 29 and pressure plate 8, and between the pin 31 and the lugs 32, 33. The mutual contact areas of these loosely interfitted parts are thus protected against undue wear due to engine induced vibrations when the clutch is kept in its disengaged condition.

A circumferential series of coil springs 61 react between the back plate 7 and the pressure plate 8 so as to overcome drag created by the spring devices 38 and 44.

I claim:

1. In a friction plate clutch the combination of a rotatable torque transmitting drum element, a torque transmitting shaft element extending axially of said drum element in rotatable relation thereto; a back plate non-rotatably secured to said shaft element in an axially fixed position and having an externally splined hub; a pressure plate loosely spline connected with said hub in axially slideable and radially loose relation thereto; a stack of interleaved driving and driven clutch plates operatively interposed between said drum and shaft elements; and articulated link mechanism pivotally connected to said pressure plate and operable to shift said pressure plate toward said back plate; and spring means biasing said pressure plate into a radially fixed relation to said hub, said spring means comprising a coil spring seated in a radial bore of said hub and bearing against said shaft element and also bearing radially outward upon said pressure plate.

2. A clutch as set forth in claim 1 and further comprising an adjusting ring having internal screw threads in loose cooperative engagement with external screw threads of said hub, and spring means biasing said adjusting ring into radially fixed relation to said hub.

3. A clutch as set forth in claim 1 and further comprising a sliding sleeve fitted to said shaft element in radially loose relation thereto; pivot joints connecting said sleeve with said articulated link mechanism; and spring means biasing said sleeve into radially fixed relation to said shaft element.

4. A clutch as set forth in claim 1 and further comprising spring means operatively associated, respectively, with pivot joints connecting said articulated link mechanism with said pressure plate so as to inhibit vibration induced play of said pivot joints.

5. A clutch as set forth in claim 4 wherein said play inhibiting spring means of said pivot joints comprise spring washers, reacting between relatively rotatable parts of said joints.

6. In a friction plate clutch the combination of a rotatable torque transmitting drum element, a torque transmitting shaft element extending axially of said drum element in rotatable relation thereto; a back plate non-rotatably secured to said shaft element in an axially fixed position and having an externally splined hub; a pressure plate loosely spline connected with said hub in axially slideable and radially loose relation thereto; and adjusting ring having internal screw threads in loose cooperative engagement with external screw threads of said hub, and second spring means biasing said adjusting ring into radially fixed relation to said hub, said second spring means comprising a coil spring seated in a radial bore of said hub and bearing radially outward upon said adjusting ring, a stack of interleaved driving and driven clutch plates operatively interposed between said drum and shaft elements; an articulated link mechanism pivotally connected to said pressure plate and operable to shift said pressure plate toward said back plate; and spring means biasing said pressure plate into a radially fixed relation to said hub, said spring means comprising a coil spring seated in a radial bore of said hub and bearing against said shaft element and also bearing radially outward upon said pressure plate; a sliding sleeve fitted to said shaft element in radially loose relation thereto; pivot joints connecting said sleeve with said articulated link mechanism; and third spring means biasing said sleeve into radially fixed relation to said shaft element; said third spring means comprising a coil spring seated in a radial bore of said sleeve and bearing radially inward upon said shaft element.

* * * * *